M. WAGNER.
RESILIENT WHEEL.
APPLICATION FILED MAR. 29, 1912.
1,034,327.
Patented July 30, 1912.
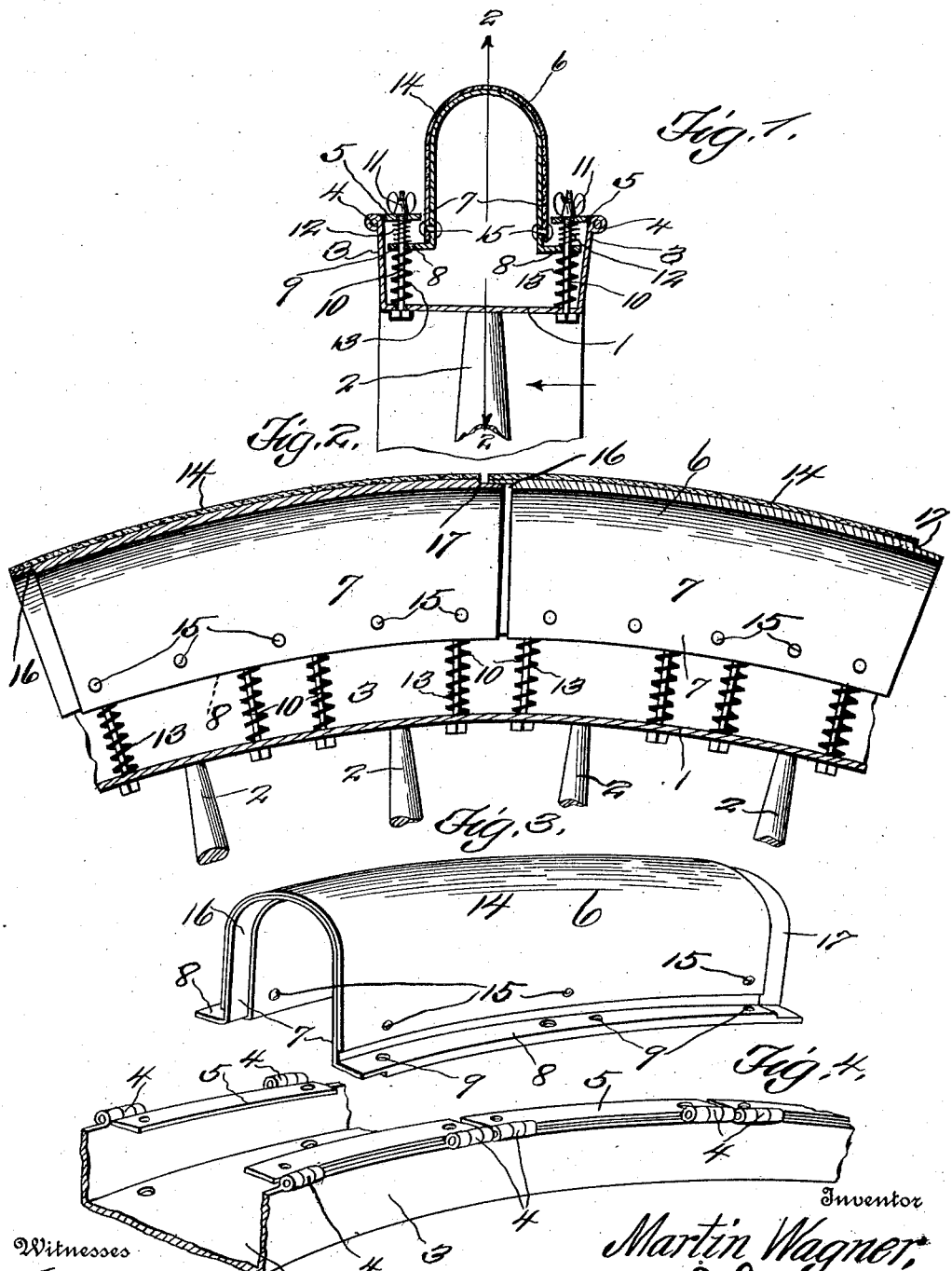
Witnesses
Francis G. Boswell,
C. E. Clements.
Inventor
Martin Wagner,
By D. Swift & Co.
Attorneys

UNITED STATES PATENT OFFICE.

MARTIN WAGNER, OF RAYMOND, MINNESOTA.

RESILIENT WHEEL.

1,034,327.

Specification of Letters Patent.

Patented July 30, 1912.

Application filed March 29, 1912. Serial No. 687,060.

*To all whom it may concern:*

Be it known that I, MARTIN WAGNER, a citizen of the United States, residing at Raymond in the county of Kandiyohi and State of Minnesota, have invented a new and useful Resilient Wheel; and I do hereby declare the following to be a full, clear, and exact description of the invention, such as will enable others skilled in the art to which it appertains to make and use the same.

This invention relates to a new and useful resilient wheel.

It is the object of this invention to provide a resilient wheel, in which various essential features of construction exist.

One of the features of the construction is the provision of a sectional tread, each section of which is resiliently mounted in a trough shaped rim, the upper edges of the sides of which are provided with a series of hinged flanges, between which and the bottom of the trough-shaped rim, the resilient means of the sectional tread coöperates. Devices are provided for regulating the resilient means.

The invention comprises further features and combination of parts, as hereinafter set forth, shown in the drawings and claimed.

In the drawings:—Figure 1 is a cross sectional view through the trough-shaped rim of the wheel, showing one of the sections of the tread held resiliently in position. Fig. 2 is a sectional view on line 2—2 of Fig. 1. Fig. 3 is a detail view in perspective of one of the sections of the sectional tread. Fig. 4 is a detail view in perspective of a portion of a trough-shaped rim, showing the hinged flanges.

Referring to the drawings 1 designates the annular rim, which, in cross section, is trough-shaped. The spokes 2 may be secured to the rim in any suitable manner. The upper portions of the sides 3 of the rim are provided with hinged connections 4, on which the flanges 5 (which are in sections) swing, when it is desired to remove one or another of the sections of the tread 6. The sections of the tread are arched or U-shaped, and the portions 7 thereof terminate in flanges 8, each of which is provided with a plurality of apertures 9, through which the bolts or pins 10 extend. The bolts 10 penetrate the bottom of the trough-shaped rim, the flanges 8 and the flanges 5, and receives winged nuts 11 on their upper ends.

Interposed between the flanges 8 and the flanges 5 and surrounding the bolts 10 are springs 12. Between the bottom of the trough-shaped rim and the flanges 8 and also surrounding the bolts 10 are springs 13, the resistance of which against compression is greater than that of the springs 12, owing to the fact that the springs 12 are made of lighter gage wire than the springs 13. The springs 13 afford resiliency for the sections of the tread as they come in contact with the ground, and when pressure is relieved, the springs 12 act to prevent the flanges 8 of the tread sections from being thrown against the flanges 5. The winged nuts 11 constitute means for regulating the springs, thereby increasing or decreasing the compression of the same.

The sections of the tread may be made in any desired shape, other than that shown.

The sections of the tread are provided with coverings 14 of canvas, rubber or any other suitable material, which coverings are secured to the sections, as shown at 15.

One end of each section of the tread on its inner surface is provided with a recess 16, while the opposite end on the outer face is correspondingly recessed as shown at 17, thereby permitting the sections to be arranged in overlapping sequence.

From the foregoing it is to be noted, there has been produced an efficient and desirable resilient wheel, and one which has been found practical.

The tread sections are designed to be made of steel or any other suitable material.

The drawings disclose one form only of the invention, but in practical fields this form may necessitate alterations, to which the patentee is entitled, provided the alterations are comprehended within the scope of what is claimed.

The invention having been set forth, what is claimed as new and useful is:—

1. In a resilient wheel, an annular rim trough-shaped in cross section, the upper portions of the sides of the rim having hinged sectional flanges, bolts passing through the hinged flanges and the bottom of the annular rim and provided with means to hold the hinged flanges in position, tread sections having outwardly extending flanges guided on the bolts and arranged between the sectional hinged flanges and the bottom of the trough, and means affording resiliency between the flanges of the tread sections and the bottom of the trough-shaped rim and the hinged flanges.

2. In a resilient wheel, an annular rim trough-shaped in cross section, the upper portions of the sides of the rim having hinged sectional flanges, steel tread sections having outwardly extending flanges arranged between the sectional hinged flanges and the bottom of the trough-shaped rim, bolts penetrating the bottom of the trough-shaped rim, the flanges of the tread sections and the hinged flanges, springs surrounding the bolts between the flanges of the tread sections, and the bottom of the trough-shaped rim and the hinged flanges, and means on the bolts for regulating the springs thereby increasing or decreasing the compression thereof.

3. In a resilient wheel, an annular rim trough-shaped in cross section, the upper portions of the sides of the rim having hinged sectional flanges, steel tread sections arranged in annular sequence and overlapping one another and disposed partially in a trough-shaped rim, the tread sections having outwardly extending flanges arranged between the sectional hinged flanges and the bottom of the trough-shaped rim, bolts penetrating the bottom of the trough-shaped rim, the flanges of the tread sections and the hinged flanges, springs surrounding the bolts between the flanges of the tread sections, and the bottom of the trough-shaped rim and the hinged flanges, and means on the bolts for regulating the springs in order to increase or decrease the compression thereof, each tread section having a canvas covering.

In testimony whereof I have signed my name to this specification in the presence of two subscribing witnesses.

MARTIN WAGNER.

Witnesses:
E. S. Burns,
H. N. Ashley.

---

Copies of this patent may be obtained for five cents each, by addressing the "Commissioner of Patents, Washington, D. C."